Feb. 24, 1959  J. A. POTCHEN ET AL  2,875,117
MULTILAMINAR PANEL
Filed Aug. 29, 1955
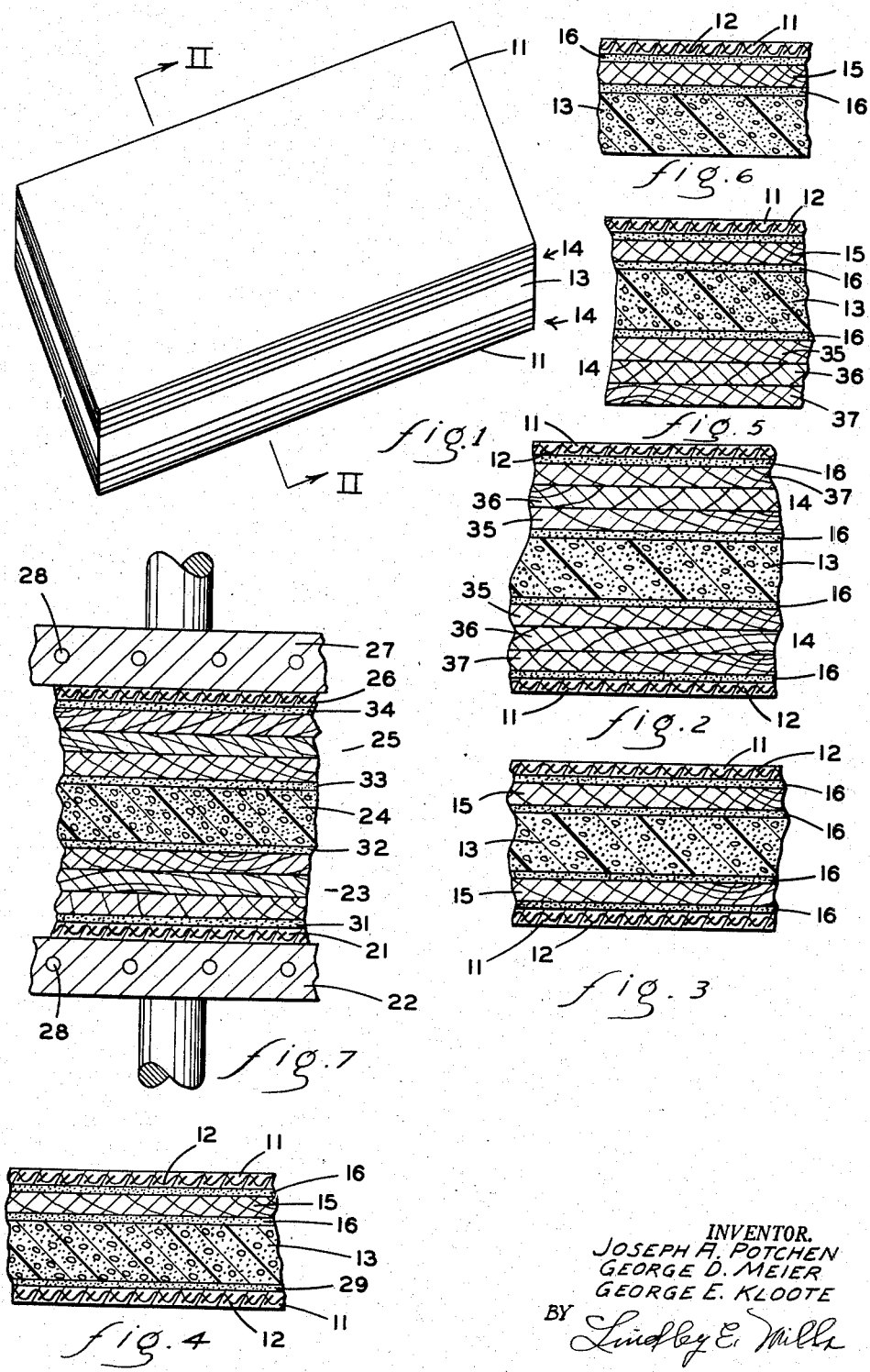
INVENTOR.
JOSEPH A. POTCHEN
GEORGE D. MEIER
GEORGE E. KLOOTE
BY Lindley E. Mills

United States Patent Office 2,875,117
Patented Feb. 24, 1959

2,875,117

MULTILAMINAR PANEL

Joseph A. Potchen, Marne, and George E. Kloote and George D. Meier, Grand Rapids, Mich., assignors, by mesne assignments, to Haskelite Manufacturing Corporation, a corporation of Delaware Application August 29, 1955, Serial No. 531,036

11 Claims. (Cl. 154—128)

This invention relates to a multilaminar article, particularly to a panel or other structure characterized by its multilaminar construction, its light weight and insulating properties and by its high ratio of strength to weight, especially with respect to lateral stresses. This application is a continuation-in-part of application Serial No. 479,498, filed January 3, 1955, and now abandoned.

The art of making lightweight panels and other structures of various sorts and constructions useful for structural, insulating or decorative purposes has become of great importance. Panels made according to the so-called "honeycomb" design have been employed for many years and their properties and methods of construction are well known. More recently panels have been fabricated employing a light weight core of a foamed resinous substance with a facing sheet adhered to or formed integral with the surface of the core. Such structures are of value for many applications and if properly constructed are usually characterized by a relatively high ratio of strength to total weight.

It is known that the strength of a panel, a beam or a similar type of structure, especially its stiffness and resistance to flexure or failure under lateral load, is related intimately to the tensile strength of the surface and adjacent layers of the article which become the convex surface when the article is flexed and also to the resistance to damage by compression of the material in and adjacent to the concave surface of the flexed article. It is apparent that for greatest resistance to damage under lateral load per unit weight the strengths of these two areas should be balanced in such a way that the one will fail under tension and the other will fail under compression when approximately the same lateral load is applied to the article. Any excess of the respective strength of one of these regions over that of the other is obtained only at a wasteful increase in weight and in amount of material utilized in forming the structure. Ideally, a panel or beam should, for least weight for a given resistance to lateral load, fail under tension on the convex side and under compression on the concave side under the same load.

Foamed resinous cores for panels and similar articles are often formed by cutting a mass of the foamed resin to the desired configuration and size and then adhering a facing sheet to it. Foamed resinous substances can be prepared having densities as low as from two to about ten pounds per cubic foot without any great decrease in the tensile or compressive strength of the resin when based on the actual amount of material per unit volume. The actual tensile and compressive strengths of these low density cores are, of course, relatively low. However, when they are faced with suitable facing sheets they exhibit considerable resistance to damage and failure under the application of a lateral load. Suitable facing sheets, such as those prepared from a polyester resin reinforced with unoriented glass fibers or with glass fabrics have remarkably high tensile strengths and make ideal facing sheets for lightweight cores insofar as this particular property is concerned. As generally employed, however, they leave much to be desired insofar as reinforcing the concave side of a flexed structure against failure by compression is concerned. Such facing sheets of adequate tensile strength are generally relatively thin and thus buckle relatively easily under longitudinal compression, even though adhered firmly to the lightweight core, with the result that such lightweight faced panels almost invariably fail under increasing lateral load by impressive buckling of the concave side of the flexed structure. This is because the combination of the facing sheet and the adjacent layers of the lightweight core on the concave side of the panel are not sufficiently resistant to buckling under compression to balance the extraordinary tensile strength of the facing sheet on the convex side.

The strength of such an article under lateral load can, of course, be increased by increasing the density of the lightweight core or by increasing the thickness of the facing sheet, or by both. This is obviously undesirable both from the point of view of increasing the weight per unit area of the structure and from the point of view of increasing its cost due to the use of additional material. In addition, such increases in the density of the core or in the thicknesses of the facing sheets have little or no effect insofar as equalizing the load under which the structure will fail by tension on its convex side and by compression on its concave side. Thus the basic objection to such structures remains largely unresolved by such expedients.

It has now been found that many of the deficiencies of lightweight faced panels as heretofore prepared, which comprise a lightweight core and a facing sheet of high tensile strength, can be overcome in great measure by interposing between the lightweight core and the facing sheet a sheet or ply of a substance which has a high ratio of compressive strength to weight and adhering the assembly firmly together. The resistance to failure by buckling of the concave side of the panel or structure reinforced in this manner on its concave side is thus increased enormously at very little increase in overall weight. Structures can be prepared easily and economically wherein failure of the concave side under compression and of the convex side under tension occur under much more nearly the same lateral load than is possible when such a compression-resistant ply is omitted. The net result is that the multilaminar structure thus prepared is much stiffer and has a much higher strength to weight ratio insofar as lateral stresses are concerned than previously known lightweight panels. The compression-resistant ply is preferably constructed of wood or a wood-based material because of the high ratio of compressive strength to weight of such materials. Suitable sheets include a single ply of wood, a plywood sheet, a hardboard sheet, and the like. Sheets of other compression-resistant materials can be used, if desired, such as a sheet of high density foamed polystyrene or a high density foamed polyisocyanate, but the invention will be described with particular reference to the employment of single-ply wood sheets and plywood sheets. Such sheets will, for convenience, sometimes be referred to herein simply as "wood sheets."

Although the advantages just described can be realized in considerable measure by interposing a wood sheet between the lightweight core and the facing sheet on only one side of the structure, especially when it is possible to insure that the lateral load will always be applied to the side of the structure adjacent the wood sheet, it is generally advantageous, and greatly preferred, to insert a wood sheet beneath the facing sheet on each side of the structure to provide a panel of greatest stiffness and also of high resistance to failure under lateral load regardless of which side receives the load. In addition, it is generally preferable to employ, instead of a single ply of wood, a multiply sheet of previously formed plywood, e. g. a 3-ply, 5-ply or other suitable sheet of plywood. The plywood employed can be either of marine or non-marine grade, as desired, depending upon the conditions to which the final structure is to be subjected. The wood sheet can, if desired, be impregnated with a suitable resin to increase the waterproof character and permanence of the final structure.

The invention can be understood readily by reference to the accompanying drawing wherein, in the interest of clarity, certain features are shown on a somewhat exaggerated scale and wherein:

Figure 1 is an oblique elevation of a multilaminar panel embodying features of the invention, Figure 2 is an enlarged and distorted partial sectional elevation taken along the line II—II of Figure 1, Figure 3 is an enlarged and distorted partial sectional elevation of a panel illustrating another modification of the invention, Figure 4 is an enlarged and distorted partial sectional elevation of a panel illustrating another modification of the invention, Figure 5 is an enlarged and distorted partial sectional elevation of a panel illustrating still another modification of the invention, Figure 6 is an enlarged and distorted partial sectional elevation of a panel illustrating a further modification of the invention, and Figure 7 is a schematic illustration of apparatus suitable for carrying out the process of the invention.

The article of the invention, as illustrated by the modification of Figures 1 and 2, comprises a pair of facing sheets 11 which, as noted previously, can each conveniently be a sheet of a polyester resin reinforced with glass filaments 12. Between the facing sheets 11 there is interposed a lightweight preformed body or core 13 of a foamed resin which can conveniently be a foamed polystyrene type resin. Between the foamed resinous core 13 and each of the facing sheets 11 there is interposed a preformed wood sheet, designated by the general reference numeral 14, which is in this instance a conventional sheet of plywood composed of the plies 35, 36 and 37. The two facing sheets 11, the two compression-resistant sheets 14 and the foamed resinous core 13 are adhered and bonded firmly together along their contacting surfaces by thin layers 16 of a suitable adhesive. The amount of adhesive used need only be that sufficient to promote a firm bond, the layer of adhesive generally being not more than a very few thousandths of an inch thick.

The modification of the article of the invention illustrated in Figure 3 comprises a pair of glass-reinforced polyester resin facing sheets 11 and a foamed resinous core 13 as in the case of the panel of Figure 2. In this instance, however, there is interposed between each of the facing sheets 11 and the core 13 a compression-resistant sheet 15 consisting of a single ply of wood which may be of suitable thickness to contribute the desired degree of stiffness and resistance to compression. The facing sheets 11, compression-resistant sheets 15 and the core 13 are adhered together with a suitable adhesive 16 as before.

In the modification illustrated in Figure 4 a single ply of wood 15 is interposed between and bonded by an adhesive 16 to the lightweight core 13 and the facing sheet 11 on one side of the core, the other side of the core 13 being bonded with an adhesive 29 directly to the other facing sheets 11. This modification is best suited to resist failure under lateral load when the load is applied to the facing sheet which is adhere to the wood ply 15 rather than when the load is applied to the other facing sheet.

The modification illustrated in Figure 5 is similar to the modification in Figure 4 in that there is assembled and adhered on one side of a lightweight core 13 a single wood ply 15 and a glass-reinforced polyester facing sheet 11. However, the modification of Figure 5 differs from the modification of Figure 4 in that the facing sheet 11 of Figure 4 opposite the wood ply 15 is replaced with a sheet of plywood, noted generaly at 14, consisting of the three plies 35, 36 and 37. The sheet of plywood 14 is adhered to the side of the lightweight core 13 opposite the single wood ply 15 with an adhesive 16. This modification is intermediate in rigidity between the modification of Figure 2 and those of Figures 3 and 4. It is highly resistant to flexure and damage by the application of a lateral load, especially when the load is applied so as to cause the plywood sheet 14 to become the concave surface of the flexed article.

Figure 6 illustrates yet another modification of the invention which is somewhat similar to that of Figure 4 with the exception that the lightweight core 13 is unfaced on the side opposite the wood ply 15. This modification of the invention is of particular value where the panel or article can be mounted for use with the unfaced side of the core 13 in direct contact with the surface of a rigid structure, such as a floor or wall, which effectively prevents flexure of the panel when a lateral load is applied to its faced side. Under such conditions of usage the panel is much more resistant to fracture under heavy lateral loads, as when it is used on a floor and walked upon, than is a panel similar in every respect except for the omission of the wood ply 15.

One method of carrying out the process of the invention and one form of apparatus which can be employed are illustrated schematically in Figure 7. A preformed glass-reinforced polyester resin facing sheet 21 of suitable thickness and composition is coated on one side with a suitable adhesive 31 and then placed with the coated side up on the lower platen 22 of a press. A preformed compression-resistant sheet 23, in the case illustrated a 3-ply plywood sheet, is then coated on one side with a suitable adhesive 32 and placed with its coated side upward on the coated side of the facing sheet 21. A preformed foamed resinous core 24 is then placed on the coated side of the compression-resistant sheet 23.

A second compression-resistant sheet 25, in this instance also a 3-ply plywood sheet, is then coated on one side with a suitable adhesive 33 and placed on top of the foamed resinous core 24 with its coated side in contact with the core. A second preformed facing sheet 26, in this instance also a glass-reinforced polyester resinous sheet identical with the facing sheet 21, is then coated on one side with a suitable adhesive 34 and placed on top of the second compression-resistant sheet 25 with its coated surface in contact with the second compression-resistant sheet 25.

It should be mentioned that, in general, it is sufficient to coat only one side of the compression-resistant sheets 23 and 25 with an adhesive according to the manner just described but that, if desirable or necessary to promote a better bond between the compression-resistant sheets and the respective glass-reinforced polyester facing sheets 21 and 26, both sides of the compression-resistant sheets 23 and 25 can be coated with adhesive. In addition, adhesive can, if desired, be applied to the surfaces of the foamed resinous core 24 when laying up the panel. Generally speaking, however, this is unnecessary and is of some disadvantage because of the excessive quantity of adhesive required, it being practically impossible to coat the cut surface of the foam without filling all of the open voids or pits in the surface with adhesive. It should also be mentioned that care is used in laying up the multilaminar article to insure as nearly as possible the exclusion of air from between the several laminae to avoid the existence in the finished article of voids or regions of non-adherence between the laminae.

After the panel has been laid up as just described, the press is closed and the desired amount of pressure exerted on the panel between the platens until the layers of adhesive have hardened or set and the panel has become dimensionally stable. The amount of pressure exerted on the panel by the press is controlled, conveniently by pressing to stops, so as to insure adequate and firm contact of the several laminae with one another and to provide a finished article with smooth parallel lateral surfaces and of a high degree of uniformity in thickness throughout. At the same time, the pressure employed is insufficient to damage the lightweight core by crushing, although a certain amount of decrease in the thickness of the core under the pressures employed is generally effected without damaging its mechanical structure and strength. Such decrease in thickness of the core should not in most instances amount to more than 5 or 6 percent, generally less, of its original thickness, depending, of course, upon the original density and the chemical nature of the core. Such slight decrease in the overall thickness of the laid-up panel by pressure during the curing operation just described is also advantageous in that it permits the overcoming in the press of any inaccuracy in thickness of the several preformed laminae and, at the same time, permits the formation of a panel of extreme uniformity in thickness. No increase in thickness of the panel is observed upon removal of the finished panel from the press.

The curing process can generally be hastened and the curing time shortened correspondingly by utilizing a press equipped for heating in conventional fashion, e. g. the platens 22 and 27 of Figure 7 can be provided with ducts 28 through which a heating fluid can be circulated. Other conventional heating means can also be employed. It has been observed that, in general, the multilaminar panel can be removed from the press before hardening or setting of the adhesive is entirely complete without detracting from the dimensional stability of the article. The last stages of the hardening or setting of the adhesive can thus be caused to occur outside the press, e. g. at ambient temperature and pressure, so that the press is released sooner for the preparation of another panel. Presses of conventional design having multiple heated separators can, of course, be used, if desired, and a number of panels or articles made at the same time. The article can eventually be trimmed or cut to size by grinding or sawing in conventional fashion, as desired.

Alternative procedures for assembling and adhering the several laminae of the multilaminar article together can be employed and are even sometimes advisable. Thus, in one variation of the process for the formation of the article described in connection with Figure 7, the facing sheet 21 is adhered to the plywood sheet 23 with an adhesive 31 in a press as a preliminary operation, the facing sheet 26 being adhered to the plywood sheet 25 with an adhesive 34 in entirely similar manner. These two identical sub-assemblies are then each coated on their free plywood faces with adhesives 32 and 33 and assembled in the press with the adhesive-coated surfaces facing one another and with the foamed resinous core 24 located between them. The press is then closed as before and heated, if desired, whereby the layers of adhesive 32 and 33 are caused to harden and a final structure identical with that described previously is produced. Other orders of making sub-assemblies and of then adhering them together will be apparent in view of the description already given.

Such variations of the process are sometimes economical, e. g. when two of the sub-assemblies can be made identical with one another, as in the instance just given, or when the final article is so thick that an undesirably long time is required for transfer of heat to the most centrally located adhesive. In the latter instance the article can even be built up lamina by lamina, if desired, so that at no time is it necessary to heat an adhesive through more than one lamina. Another advantage which can be realized by such variations is that of being able to adjust the degree of heating to the requirements or tolerances of the several laminae and layers of adhesive. Thus, in the variation described in detail above, the temperature employed to cure the adhesives 31 and 34 in making the sub-assemblies can conveniently be considerably higher, and the time correspondingly shorter, than that employed in curing the adhesive layers 32 and 33 because of the danger of fusing and injuring the foamed resinous core 24.

The preformed facing sheets utilized in making the multilaminar article of the invention are, as mentioned previously, formed of a polymerized polyester resinous sheet reinforced with glass fibers. The glass fibers employed can be unoriented, as in the form generally referred to as "mats," but for greatest tensile strength of the facing sheet and ease of handling during its production the glass filaments are preferably in one of the forms generally referred to as "woven fabric" or "woven roving" which are formed by weaving strands of glass filaments into a fabric. The characteristics of such fabrics are well known in the art and need not be elaborated upon here. Fabrics are available such that a facing sheet prepared using a single ply of the fabric can have a thickness of from about 0.015, or thinner, to about 0.035 inch. Thicker, and stronger, facing sheets can be prepared by using a plurality of plies or woven glass fabrics or a combination of glass mat and fabric.

Facing sheets such as those just described can be formed according to known procedures. The formation of the facing sheets is sometimes accomplished by drawing a sheet of the fabric continuously through an impregnating bath of the partially polymerized resin containing a catalyst and copolymerizable agent, such as styrene, thence through a heated zone to polymerize and harden the polyester composition. The sheet is then cut into suitable lengths or, if not too thick, it can be rolled up on a fairly large radius. Sheets prepared in this manner have the advantage that the glass strands are maintained under stress in the direction of travel of the fabric and remain essentially straight in the finished sheet. The thickness of the sheet can be controlled to close tolerances by drawing it, prior to hardening the resin, between accurately spaced opposed rolls or doctor blades to remove the excess resin. Generally speaking, facing sheets prepared by this and similar procedures contain from 35 to 60 percent by weight, usually from about 40 to about 50 percent, of glass, the balance being resin.

The polyester resinous composition used in making the glass reinforced facing sheet can be any of the numerous commercially available polyester resins recommended for this purpose. As available and as generally employed, they are thick, viscous liquids capable of further polymerization and copolymerization under suitable conditions to effect cross-linking and form thermoset bodies. They are made by esterifying an olefinically unsaturated dicarboxylic acid, such as maleic acid, itaconic acid and citraconic acid, as well as mixtures thereof with one another or with a considerable proportion of a functionally saturated dicarboxylic acid, such as phthalic acid, tetrachlorophthalic acid, adipic acid and the like, with a polyhydric alcohol. Of special interest are the polyesters containing a considerable proportion of esters of a halophthalic acid because of their substantially non-inflammable nature.

Polyhydric alcohols generally employed include ethylene glycol, propylene glycol, butylene glycol, polyethylene glycol, polypropylene glycol, monoesters and monoethers of glycerol and the like. Esterification is carried on until a predominantly linear polymer of suitable viscosity and average molecular weight is obtained.

The predominantly linear polyester thus obtained contains polymerizably reactive ethylenic unsaturation which, by copolymerization with a polymerizable olefinically reactive monomer, leads to the formation of cross-linked thermoset resins without the use of any appreciable pressure, if desired, and at ambient or conveniently low temperatures. Suitable olefinically reactive monomers include styrene, the halostyrenes, the methylstyrenes, isopropenyl toluene, vinyl napthalene, acrylonitrile, methyl acrylate, and others. The cross-linking polymerization is usually carried out with the aid of a peroxide type catalyst.

In preparing the facing sheet using a woven glass fabric, the fabric is first impregnated thoroughly with a mixture of the polyester, peroxide catalyst and olefinically reactive monomer, e. g. 10 to 15 percent of monostyrene, being sure that each fiber is wetted thoroughly. Excess resin is then removed, if desirable or necessary, and the impregnated fabric heated to a polymerizing temperature, e. g. to 200° to 240° F. for a short time. The resulting facing sheet is characterized by a high degree of impermeability to moisture and vapor, by its high resistance to many and varied types of chemical reagents and by its high electrical insulating properties. The impregnating composition also frequently is made up containing conventional modifying agents, such as triethyl phosphate and other flexibilizers, plasticizers and viscosity reducing agents. Suitable pigments or soluble dyes can be included in the polyester composition prior to hardening, if desired.

The lightweight core used in preparing the article of the invention is, as indicated previously, preformed prior to the laying up of the article. The core is composed of a foamed resinous material of suitable density and strength. The preferred material is a foamed polystyrene type resin and the invention will be further described with particular reference to it, although other suitable foamed resinous cores, such as those formed by foaming an alkyd or polyester resin with toluene diisocyanate, can be employed, if desired. The preformed core is prepared in any convenient manner, as by foaming the resin in a mold or by cutting a core of suitable dimensions from a mass of the foamed composition. Cores of the desired shape and size can be formed directly in this way or they can be built up from smaller pieces, if desired, to form larger cores utilizing a suitable adhesive, such as an epoxy resinous adhesive to be referred to later, to join the abutting edges. The preparation of foamed masses of polystyrene type resins is well known in the art, as well as the methods employed in cutting, trimming and shaping them to produce blocks, slabs and other desired shapes. Such foamed compositions are composed of a multitude of small, roughly spherical voids each completely surrounded by a substantially impervious membrane of the resinous composition. Foams may be made having a uniform density as low as about two pounds per cubic foot without serious loss of strength on the basis of the actual amount of resin per unit volume. Even such lightweight foams are not easily crushed, especially when pressure is applied by a ragid surface parallel to the plane of the surface of the foam. Such polystyrene type foams are rotproof, verminproof, non-absorbent and have high heat, sound and electrical insulating values. They are non-warping and non-shrinking at ordinary and moderately elevated temperatures.

Polystyrene type resins which can be employed for making the foamed cores for the panels of the invention are those made by polymerizing a hydrocarbon or halohydrocarbon having a vinyl radical on an aromatic nucleus and include the products resulting from the polymerization of styrene, monomethylstyrene, dimethylstyrene, vinyl napthalene and the halogenated styrenes. Foams made from polyhalostyrene are of particular value in the present instance because of their substantial fireproofness and self-extinguishing characteristics. The foamed core used in the panel preferably has a density of from about 2 to about 10 pounds per cubic foot, depending upon the particular properties of the panel desired, although cores having a density higher than this can be employed, if desired.

Any suitable adhesive can be employed in bonding the laminae together to form the laminated panel or article of the invention. Many excellent adhesives are available and need not be described in detail here. Suitable adhesives include those variously referred to as rubber cement, protein latex, albumen, phenol-aldehyde adhesives and the like, as well as those containing a polyester resinous substance or an epoxy resinous substance as a base. Many of these can frequently be employed using cold-setting techniques wherein the assembled coated laminae are merely pressed together by passing them between tensioned rolls, rather than in a press, and final setting of the adhesive permitted to occur under atmospheric pressure.

It will be noted that in most instances the preparation of the article of the invention involves the bonding of a compression-resistant wood or plywood sheet to the reinforced polyester facing sheet and to the lightweight core. In such instances, because of the absorptive nature of the wood sheet, a wide range of adhesives can be employed, including even those which contain water or which evolve a certain amount of water during hardening or setting. This is particularly true when the wood-based compression-resistant sheet is incompletely saturated or impregnated with a water-impervious resin, such as is the case with the ordinary grade of non-marine plywood. In instances where a high grade of marine plywood is employed which is impregnated with resinous materials to such a degree that it is practically impervious to water or water vapor, it is generally advisable to use an adhesive which evolves little or no water during the setting process. The epoxy resin-based adhesives, which are generally hardened by further reaction with an amine, can be utilized in such instances with entire satisfaction. The amine-hardened epoxy resinous adhesives are characterized by non-evolution of water or gaseous substances during setting and are preferred in instances, such as that illustrated in Figure 4, where one of the reinforced polyester facing sheets and the core of foamed polystyrene type resin, both of which are highly impervious to moisture, are adhered directly together. These adhesives have the added advantage that they can be formulated so as to be devoid of substances which tend to dissolve the polystyrene type resins and thus do not lead to a weak bond, such as is formed when an adhesive is employed containing a solvent for the polystyrene type resin.

As mentioned previously, the compression-resistant layer or sheet interposed between the lightweight core and the reinforced polyester facing sheet is preferably a single ply of wood or a sheet of plywood. The thickness of the single wood ply or of the plywood sheet and, in the case of the latter, the number and thickness of the plies, the type of adhesive employed in bonding the plies together and other factors apparent to those familiar with the plywood art, can be taken into account to produce a multilaminar panel having the desired characteristics. The properties of the various species of wood which can be employed are well known in the art and need not be gone into in detail here. Generally speaking, however, it is desirable to employ a wood-based sheet having as high a ratio of compression resistance to weight as possible to avoid any more increase in the weight per unit area of the multilaminar panel produced than is necessary to provide the properties desired. Especially suitable species include fir, birch, oak, gum and poplar, although other species can, of course, be employed if desired.

It will be noted that it is impossible to define accurately the thickness and tensile strength of the reinforced polyester facing sheet, the thickness and compression-resistance of the wood or plywood sheet and the density and chemical composition of the foamed resinous core employed in a manner which will cover all cases because of the fact that any slight variation in one of these properties will, for best results, require some adjustment in many of the other properties mentioned. However, it is a characteristic of the invention that, when properly prepared with due consideration to all of these various factors, the multilaminar panel prepared in the ways described herein is superior to those heretofore prepared, particularly with respect to its high resistance to failure under a lateral load when compared with its total weight, its stiffness and its resistance to damage by impact.

It should be pointed out that important advantages of the multilaminar panel of the present invention result from the fact that each surface and adjacent layers of the preferred modification comprise a glass-reinforced thermoset polyester resinous facing sheet adhered directly and firmly to a wood-base sheet. This particular structure is ideally suited to withstand both tensile and compressive stresses, utilizing the properties of both the reinforced polyester sheet and the wood sheet because of the relationships between the values of Young's modulus and of the ultimate tensile strengths of these two substances.

As has been pointed out previously, the ultimate strength at failure under tension of the glass-reinforced polyester resinous facing sheet is extremely high and is dependent to a considerable degree on the proportion of glass in the sheet. Sheets prepared as described above containing approximately 45 percent by weight of glass generally have an ultimate tensile strength of 20,000 pounds per square inch, or more. Wood has an ultimate tensile strength at failure lower than this, generally of the order of 8,000 to 9,000 pounds per square inch depending, of course, upon the species. The value of Young's modulus for the glass-reinforced polyester resinous facing sheet is sufficiently low, generally of the order of 3,000,000 pounds per square inch, as compared with an average value of roughly 1,500,000 pounds per square inch for wood, so that it will elongate sufficiently under tension before failure to allow a considerable part of the tensile load to be borne by the wood sheet, the net result being an ultimate tensile strength of the combination at failure greater than that of either sheet alone.

This advantage would not be realized if a facing sheet were used having a Young's modulus many times greater than that of wood even though its ultimate tensile strength at failure was also much greater than that of wood. Under such circumstances the facing sheet would not elongate sufficiently to shift any appreciable part of the tension to the wood sheet, and the combination of sheets would ultimately fail under tension when the facing sheet failed. The wood sheet would thus merely represent an unutilized weight of material on the side of the article subjected to tensile stress. It can be understood readily that similar considerations apply insofar as the resistance to compression on the concave side of the flexed article is concerned when it is remembered that the facing sheet and the wood sheet are adhered firmly together and that buckling of the facing sheet, even though it be very thin, is prevented entirely for compressive stresses short of that causing failure of both of the sheets as a unit. Under such conditions the facing sheet as well as the wood sheet resists compression in accordance with the value of its Young's modulus.

The relatively low value of Young's modulus for the reinforced facing sheet, as compared with its value for glass alone, is thought to be due to the fact that the individual glass fibers in the facing sheet are not entirely linearly disposed, even when a woven fabric is employed in making the sheets and the fabric is maintained under considerable longitudinal tension during the polymerization of the resin to form the thermoset sheet. Because of this somewhat non-linear disposition of the fibers within the sheet, there is a tendency for the fibers to straighten within the sheet under extreme tension prior to their failure so that the sheet elongates under tension without a corresponding degree of elongation of the individual glass filaments.

Although the invention has been described with particular reference to flat panels and their preparation, it should be pointed out that the invention contemplates curved shapes or articles of various sorts and even articles and panels of non-uniform thickness, as well as the process for making them. As an example, an elongated article can be prepared which is curved transversely with the curvature of the facing sheets being circular or parabolic, as desired. When making such articles, it is usually preferable to cut the lightweight core to approximately its final desired shape. When the facing sheets and compression-resistant sheets are heavy and relatively non-flexible, it is also preferable to form these to approximately the desired contour prior to coating them with adhesive and assembling the structure. Such operations are generally carried out to advantage in a press because of the difficulty of maintaining adequate and even contact of the several curved surfaces with one another by simple hand lay-up procedures. When the facing sheets are thin and relatively flexible, it is frequently possible to use flat sheets and to effect the desired curvature of the sheets in the press. Such latter procedure, however, may not always lead to a high degree of dimensional stability due to the inherent strained condition existing in an article formed in this way which may not be entirely relieved during the curing of the adhesive even at moderately elevated temperatures. The invention is not limited as to the ultimate shape of the panel or article so long as it includes the inventive features herein pointed out.

Certain advantages of the invention are apparent from the following examples, which are given by way of illustration only and are not to be construed as limiting:

EXAMPLE 1

A sheet of woven roving glass fabric about four feet wide was drawn continuously through an impregnating bath comprising 100 parts by weight of a polyester resin made from a mixture containing a high proportion of a polychlorinated endomethylenetetrahydrophthalic acid or anhydride (available from Hooker Electrochemical Company under the trade designation Hetron-92), 5 parts of styrene monomer, 5 parts of triethyl phosphate and 1 part of a benzoyl peroxide catalyst. The wet impregnated fabric was drawn between opposed accurately spaced driven gauging rolls to remove excess resin and to insure as complete penetration as possible of the resin between the filaments. A thin sheet of cellophane was fed over one of the gauging rolls into contact with one side of the impregnated glass fabric sheet as it entered into the nip of the rolls and a sheet of a moderately heavy glassine type paper was fed over the other roll into contact with the other side of the fabric.

The gauged impregnated fabric, faced on one side with cellophane and on the other side with paper, was fed into the nip between the smooth surface of a slowly revolving metal drum containing water at 225° F. and a heavy flexible driven belt bearing on the drum surface to effect a partial polymerization of the resinous composition. The flexible structure, still faced with cellophane and paper, was then drawn from the drum surface, after a partial revolution of the latter, over a roller having a radius of several inches and conducted between closely spaced heated plates to complete the polymerization. The solid cured sheet then passed between friction rolls which, together with the driven belt and gauging rolls, effected the forward travel of the sheet through the entire process. The cured sheet then passed beneath a transverse shear and was cut automatically into desired lengths, usually into 8 foot lengths.

The impregnated cured sheet was sufficiently flexible to be rolled up on an approximately 12 inch, or smaller, radius without injury. The cellophane and paper could be stripped easily from its surfaces. It was smooth surfaced on both sides, the surface cured in contact with the cellophane having a high gloss finish and the surface cured in contact with the paper having a smooth mat surface well adapted for bonding with an adhesive. The facing sheet thus prepared using a single ply of glass fabric contained about 45 percent by weight of glass, and had a uniform thickness of 0.030 to 0.032 inch and a very high tensile strength. It was fire resistant and self-extinguishing when ignited with a torch and the torch removed.

Another facing sheet prepared in entirely analogous fashion, but using two sheets of the glass fabric and adjusting the clearance of the gauging rolls accordingly, had a uniform thickness of approximately 0.060 inch and contained about 45 percent by weight of glass. It could not be bent on as small a radius as the thinner sheet. Similar facing sheets were prepared, some of which were about 0.015 inch thick, using other types of glass fabrics and other polyester resinous compositions, the sheets in all cases being dimensionally accurate and having properties entirely similar to those of the facing sheet just described, except that those made from non-halogen-containing resins were more combustible.

EXAMPLE 2

A pair of facing sheets containing 45 percent of glass and each 0.018 inch thick, 4 feet wide and 8 feet long were prepared as described in Example 1.

The paper and cellophane sheets were stripped from the surfaces of one of the 0.018 inch glass-reinforced facing sheets prepared as in Example 1 and the sheet coated on its mat surface, from which the paper sheet had been stripped, with a thin layer of an epoxy resinous adhesive. The sheet was then placed with its coated surface in contact with the side of a ⅛ inch 3-ply birch plywood sheet, care being taken to avoid the inclusion of air pockets between the sheets. The sub-assembly of the plywood and the facing sheet was then cold-pressed for about five minutes. The facing sheet was firmly bonded to the plywood sheet. The structure was allowed to stand undisturbed for several hours for the adhesive to cure completely. Another similar facing sheet was bonded to another similar plywood sheet in the same manner to form a second similar sub-assembly.

A slab of a foamed polystyrene type resin containing a high proportion of chloropolystyrene (available from The Dow Chemical Company under the trade designation of Styrofoam 33) weighing approximately 2 pounds per cubic foot was cut to form a lightweight core ¾ inch thick, 4 feet wide and 8 feet long. The unfaced side of the plywood sheet of each of the sub-assemblies was coated with a thin continuous layer of a cold-curing epoxy resin adhesive composition prepared by mixing four parts by weight of a high molecular weight reaction product of a diphenol and an epoxy compound (available in the form of a viscous liquid from Shell Development Company under the trade designation of Shell 828) with about one part of an amine reactant mixture (available from Bakelite Corporation under the trade designation of ERL2793) which appeared to be a reaction product of an epoxy compound and an amine.

The core and the two sub-assemblies were then assembled with the coated plywood surfaces in contact with opposite sides or faces of the lightweight core. The assembled structure was then cold-pressed to one inch stops over night in a conventional press. The multilaminar structure thus formed was then removed from the press and its edges trimmed to accurate dimensions. The panel was precisely one inch thick and weighed approximately 1.52 pound per square foot.

EXAMPLE 3

A sub-assembly was prepared by placing a glass-reinforced polyester resinous facing sheet 0.018 inch thick, similar to those described in Example 1, with its mat surface in contact with a side of a sheet of ⅛ inch 3-ply birch plywood, both surfaces having been coated with a thin continuous layer of a cold-curing epoxy resinous adhesive composition and cold-pressing the assembled sheets until the adhesive had set. A second sub-assembly was prepared in the same manner.

The uncoated sides of the plywood sheets of the two sub-assemblies were then each coated with an additional quantity of the same epoxy resinous adhesive. The coated sub-assemblies were then assembled in a press with their coated faces in contact with a lightweight core ¾ inch thick cut from a foamed polystyrene weighing 4½ pounds per cubic foot. The entire assembly was then cold-pressed to one inch stops in a press overnight. The multilaminar panel thus formed was removed from the press and trimmed to accurate dimensions. The panel was precisely one inch thick and weighed approximately 1.67 pound per square foot.

EXAMPLE 4

A number of test specimens were cut from the panels prepared as in Examples 2 and 3 and labeled with reference letters.

The specimens cut from the panel of Example 2 having a lightweight core weighing about 2 pounds per cubic foot were as follows:

No. A—68 in. x 12 in.
No. B—36 in. x 12 in.
No. C—20 in. x 12 in.

The specimens cut from the panel of Example 3 having a lightweight core weighing about 4½ pounds per cubic foot were as follows:

No. D—68 in. x 12 in.
No. E—68 in. x 6 in.
No. F—36 in. x 12 in.
No. G—20 in. x 12 in.

Each of the specimens A to G, inclusive, was subjected to an increasing lateral load, in some instances sufficient to cause failure, and the deflection under various loads measured. In the test procedure the specimen was rested in an horizontal position on a pair of parallel span supports so that the supported span of the specimen was precisely 64 inches, 32 inches or 16 inches, depending upon the particular specimen under test. This provided for a 2 inch projection of each end of the specimen past the adjacent span support. One of the span supports was mounted on a scale.

A load was applied to the top surface of the specimen distributed evenly at 8 inch centers, the end centers being 4 inches from the span supports. The scale thus registered one-half the total weight of the specimen and applied load. The load was applied in increasing increments, generally of 40 pounds each, and the deflection in inches of the specimen for each load was measured at the center of the upper surface of the span.

In the accompanying table there are given the specimen designation, width and span in inches and the core density of each specimen tested, together with the loads applied and the corresponding deflections of each, the load causing failure of the panel being noted when sufficient loading was applied to cause failure. In constructing the table, many intermediate values were omitted for the sake of convenience since a plot of the values for loading and corresponding deflections gave essentially a linear graph, usually almost to the point of failure.

Table 1

DEFLECTION OF SPECIMENS OF PANELS UNDER LOADS

| Specimen number | A | B | C | D | E | F | G |
|---|---|---|---|---|---|---|---|
| Span (in.) | 64 | 32 | 16 | 64 | 64 | 32 | 16 |
| Width (in.) | 12 | 12 | 12 | 12 | 6 | 12 | 12 |
| Core density (lb./cu. ft.) | 2 | 2 | 2 | 4.5 | 4.5 | 4.5 | 4.5 |

| Load (lb.) | Deflections (in.) | | | | | | |
|---|---|---|---|---|---|---|---|
| | A | B | C | D | E | F | G |
| 200 | .533 | .106 | .032 | .544 | 1.438 | .085 | .017 |
| 400 | 1.085 | .210 | .062 | 1.091 | 2.563 | .170 | .035 |
| 600 | 1.705 | .310 | .094 | 1.622 | 3.500 | .249 | .052 |
| 720 | 2.037 | .378 | .116 | 1.948 | 4.063 | .298 | .064 |
| 760 | (1) | .404 | | 2.044 | 4.250 | .316 | .067 |
| 800 | | .420 | .130 | 2.166 | 4.375 | .329 | .070 |
| 1,000 | | .579 | .194 | 2.608 | 5.125 | .424 | .094 |
| 1,020 | | (1) | | | | | |
| 1,200 | | | .332 | 3.157 | 5.813 | .504 | .114 |
| 1,240 | | | (1) | 3.260 | 5.875 | .528 | .117 |
| 1,320 | | | | 3.462 | 6.313 | .558 | .125 |
| 1,400 | | | | 3.680 | (2) | .589 | .135 |
| 1,600 | | | | 4.270 | | .697 | .164 |
| 1,800 | | | | 4.730 | | .784 | .183 |
| 1,960 | | | | 5.160 | | .850 | .204 |
| 2,000 | | | | (2) | | .856 | .208 |
| 2,080 | | | | | | .903 | .218 |
| 2,200 | | | | | | (2) | .244 |
| 2,340 | | | | | | | .264 |
| | | | | | | | (2) |

[1] Failure.
[2] Discontinued.

EXAMPLE 5

A glass-reinforced polyester facing sheet 0.018 inch thick, similar to that described in Example 1, was adhered to one side of a sheet of 1/8 inch 3-ply gum plywood using an epoxy resinous adhesive in a manner similar to that described in Example 3. The other side of the plywood sheet was then coated with an additional quantity of the same epoxy resinous adhesive and placed in contact with one side of a foamed polystyrene core 2 inches thick weighing about 3 pounds per cubic foot.

Another glass-reinforced polyester facing sheet, similar to the first, was coated on its mat side with some of the same epoxy resinous adhesive and the coated side of the facing sheet assembled directly in contact with the other side of the foamed polystyrene core. The entire assembly was then cold-pressed to 2 1/8 inch stops over night and then removed from the press and trimmed to size.

In a variation of the procedure just given, the second facing sheet was omitted and the assembly of one facing sheet, one plywood sheet and the lightweight core were cold-pressed to stops 2 1/8 inch thick.

In still another variation of the procedure just given, the second facing sheet was replaced with a second sheet of 1/8 inch 3-ply gum plywood and the assembly pressed to stops 2 1/4 inches thick.

EXAMPLE 6

A lightweight core 4 feet wide, 8 feet long and 6 inches thick was built up from pieces of a foamed polystyrene type resin containing a high proportion of chlorinated polystyrene. The pieces utilized were 4 feet long, 4 inches wide and 6 inches thick and had a density of approximately 2 pounds per cubic foot. They were adhered together with their 6 inch by 4 feet faces in face to face contact to make the 6 inch thick lightweight core using sufficient of an epoxy resin-based adhesive, similar to that used in Example 2, to hold them together and make a form-sustaining core.

A 4 foot by 8 foot sheet of 1/4 inch 3-ply exterior grade fir plywood was coated on one side with a polyvinyl butyral adhesive (available from Chrysler Corporation under the trade designation of Cycleweld 55-9) and the coated plywood sheet was assembled with its coated surface in contact with the mat side of a glass fabric-reinforced polyester resinous facing sheet, similar to that described in Example 1, which was 4 feet wide, 8 feet long and 0.032 inch thick and which contained about 45 percent by weight of glass. The sub-assembly thus formed was heated in a press at about 290° to 300° F. for about 15 minutes under a pressure of about 125 pounds per square inch. The sub-assembly was then removed from the press and cooled. A duplicate sub-assembly was prepared in the same manner from a second facing sheet and a second plywood sheet.

The plywood surfaces of the two sub-assemblies and the two sides of the lightweight core were each coated with a phenol-resorcinol-based adhesive containing a paraformaldehyde type catalyst (available from Catalin Corporation under the trade designation 736) and the core then assembled in a press with each of its coated sides in contact with the coated side of one of the sub-assemblies. The entire assembly was then pressed cold over night to stops 6 1/2 inches thick. Upon removal from the press, the laminated panel was found to be precisely 6 1/2 inches thick and to have a high degree of uniformity in thickness throughout. The panel was used for lining the floor of a cooler room where it received heavy loads over a long period of time without the slightest damage.

EXAMPLE 7

The resistance to impact of representative multilaminar panels prepared according to procedures given in the foregoing examples was determined.

In determining the resistance to impact, the panel under test was placed flat on a smooth horizontal rigid surface and an impact weight dropped on it. The impact weight was formed with the impacting surface consisting of a segment of a hardened steel sphere. The segment was mounted rigidly in the lower end of a cylinder which could be loaded with weights. The loaded cylinder was dropped from a precisely determined height through a vertical cylindrical tube positioned above the test specimen. The impact, measured in foot-pounds, could thus be adjusted by varying the distance through which the impact head fell and by varying the weight of the head and loaded cylinder. Impact heads were employed which were segments of spheres 1 inch, 2 inches and 3 inches in diameter. The specimen was moved between successive impacts sufficiently to avoid any effect of one impact on the region of the specimen to be subjected to the next impact. The indentation caused by the impact was measured accurately with a suitably adapted Ames dial.

The impact in foot-pounds and the indentation in inches in the surface of the specimen were recorded in each test. Each test was continued with increasing impact over regular intervals until the specimen fractured and the point at which this occurred was noted. In most instances crazing of the face of the glass-reinforced polyester resinous facing sheet occurred under impacts insufficient to fracture the specimen and the occurrence of such crazing was also noted. Tests with three specimens designated as "A," "B" and "C" were made.

Specimen A consisted of a 3/4 inch thick core of foamed polystyrene having a density of 4.5 pounds per cubic foot and having adhered to each of its sides with an epoxy resinous adhesive a sheet of 1/8 inch 3-ply hardwood plywood. The panel was faced on each of its sides with a 0.018 inch facing sheet of glass cloth-reinforced thermoset polyester resin which was adhered to the outer surface of the plywood with an epoxy resinous adhesive. The facing sheet contained about 45 percent of glass.

The impact in foot-pounds and the indentation caused in the surface of the specimen by each impact for each of the 1 inch, 2 inch and 3 inch diameter impact heads are given in the following Table 2.

Table 2

IMPACT DATA ON SPECIMEN A

| 1-inch impact head | | 2-inch impact head | | 3-inch impact head | |
|---|---|---|---|---|---|
| Impact | Indentation | Impact | Indentation | Impact | Indentation |
| 3 | .018 | 4.5 | .018 | 6 | .022 |
| 4.5 | .027 | 7.5 | .034 | 10 | .038 |
| 7.5 | ¹.060 | 10.5 | .042 | 14 | .046 |
| 10.5 | ¹.079 | 13.5 | .053 | 18 | .062 |
| 13.5 | ².128 | 16.5 | .057 | 22 | .068 |
| | | 19.5 | .067 | 26 | .083 |
| | | 22.5 | ².103 | 30 | ¹.106 |
| | | 25.5 | ¹.110 | 34 | ¹.136 |
| | | 28.5 | ¹.124 | 38 | ¹.160 |
| | | 30 | ².163 | 42.5 | ².203 |

¹ Crazing.
² Fracture.

Specimen B consisted of a 2½ inch thick core of foamed polystyrene having a density of 2 pounds per cubic foot and having adhered to each of its sides with an epoxy resinous adhesive a sheet of ⅛ inch 3-ply hardwood plywood. The specimen was faced on each of its sides with a 0.018 inch facing sheet of glass cloth-reinforced thermoset polyester resin which was adhered to the outer surface of the plywood with an epoxy resinous adhesive. The facing sheet contained about 45 percent of glass.

The impact in foot-pounds and the indentation caused in the surface of the specimen by each impact for each of the 1 inch, 2 inch and 3 inch diameter impact heads are given in the following Table 3.

Table 3

IMPACT DATA ON SPECIMEN B

| 1-inch impact head | | 2-inch impact head | | 3-inch impact head | |
|---|---|---|---|---|---|
| Impact | Indentation | Impact | Indentation | Impact | Indentation |
| 3.0 | .011 | 6 | .025 | 6 | .025 |
| 4.5 | .018 | 10 | .034 | 10 | .035 |
| 6 | .026 | 14 | .059 | 14 | .055 |
| 7.5 | ¹.061 | 18 | ¹.132 | 18 | .070 |
| 10 | ².142 | 22 | ².168 | 22 | .080 |
| | | | | 26 | .096 |
| | | | | 30 | ³.168 |
| | | | | 34 | ³.160 |
| | | | | 38 | ².212 |

¹ Crazing.
² Fracture.
³ Crazing—slight fracture.

Specimen C consisted of a 2 inch thick core of foamed polystyrene having a density of 2 pounds per cubic foot and having adhered to each of its sides with an epoxy resinous adhesive a sheet of ¼ inch 3-ply fir plywood. One side of the panel was faced with a 0.018 inch facing sheet of glass cloth-reinforced thermoset polyester resin which was adhered to the surface of the plywood with an epoxy resinous adhesive. The facing sheet contained about 45 percent glass. The plywood surface of the other side of the panel was unfaced. In carrying out the impact tests, this panel was positioned with its faced surface uppermost so that it received the impacts.

The impact in foot-pounds and the indentation caused in the surface of the specimen by each impact for each of the 1 inch, 2 inch and 3 inch diameter impact heads are given in the following Table 4.

Table 4

IMPACT DATA ON SPECIMEN C

| 1-inch impact head | | 2-inch impact head | | 3-inch impact head | |
|---|---|---|---|---|---|
| Impact | Indentation | Impact | Indentation | Impact | Indentation |
| 6 | .015 | 6 | .015 | 6 | .015 |
| 10 | .030 | 10 | .022 | 10 | .029 |
| 14 | ¹.070 | 14 | .027 | 14 | .038 |
| 18 | ².098 | 18 | .035 | 18 | .035 |
| | | 22 | .043 | 22 | .047 |
| | | 26 | .049 | 26 | .054 |
| | | 30 | ¹.080 | 30 | .055 |
| | | 34 | ¹.091 | 34 | ¹.069 |
| | | 38 | ¹.094 | 38 | ¹.080 |
| | | 42.5 | ².160 | 42.5 | ¹.075 |
| | | | | 47.5 | ¹.086 |
| | | | | 51 | ¹.146 |
| | | | | 57 | ².72 |

¹ Crazing.
² Fracture.

We claim:

1. A structural panel comprising as its essential parts a core of a foamed polystyrene type resin having a density between about 2 and about 10 pounds per cubic foot, a facing sheet of substantially uniform thickness comprising a sheet of a thermoset polyester resin reinforced with a fabric woven of strands of glass filaments, a rigid compression-resistant wood-based sheet interposed between the facing sheet and the core, and a thin layer of a resinous adhesive interposed between the facing sheet and the wood-based sheet and between the wood-based sheet and the foamed resinous core bonding the facing sheet, the wood-based sheet and the core secured together to form a unitary panel.

2. The method for forming a multilaminar panel, which comprises the steps of providing a lightweight core of a foamed polystyrene type resin, providing a facing sheet comprising a sheet of a thermoset polyester resin reinforced with glass filaments, interposing between the facing sheet and the lightweight core a sheet of rigid compression-resistant material other than the material forming said facing sheet, interposing a thin layer of a suitable adhesive between the facing sheet and the compression-resistant sheet and between the compression-resistant sheet and the lightweight core, and causing the adhesive to set and bond the compression-resistant sheet securely to the facing sheet and to the core to form a unitary multilaminar article.

3. The method for forming a multilaminar panel which comprises the steps of assembling a sheet of a rigid compression-resistant wood-based material between a core comprising a foamed polystyrene type resin and a facing sheet of a glass-reinforced thermoset polyester resin with a layer of adhesive between the core and the compression-resistant sheet and between the compression-resistant sheet and the facing sheet, subjecting the assembly thus formed to pressure to cause firm contacting of the core with the compression-resistant sheet and of the compression-resistant sheet with the facing sheet, and causing the adhesive to set and to bond the core, the compression-resistant sheet and the facing sheet into a unitary multilaminar article.

4. The method of claim 3 wherein a pair of compression-resistant sheets are assembled one on each side of the core between the core and one of a pair of facing sheets and the unitary multilaminar article produced comprises the core bonded on each side to a compression-resistant sheet with the opposite side of each compression-resistant sheet bonded to a facing sheet.

5. The method of claim 3 wherein the compression-resistant sheet is a plywood sheet.

6. The method for forming a multilaminar panel, which comprises the steps of assembling a rigid compression-resistant wood-based sheet with one of its surfaces in face to face relationship with a facing panel comprising a sheet of thermoset polyester resin reinforced with a fabric woven of strands of glass filaments with a layer of an adhesive interposed between the compression-resistant sheet and the facing sheet, subjecting the assembly thus formed to pressure to cause firm face-to-face contact of the compression-resistant sheet and the facing sheet and causing the adhesive between them to set while under pressure to bond the two sheets firmly together and form a unitary sub-assembly, assembling the sub-assembly thus formed with the unfaced side of the compression-resistant sheet in face-to-face contact with the surface of a lightweight core comprising a foamed polystyrene type resin having a density of from about 2 to about 10 pounds per cubic foot with an adhesive interposed between the core and the sub-assembly, subjecting the assembly thus formed to pressure to maintain firm face-to-face contact between the core and the sub-assembly and causing the adhesive between them to set and bond them firmly together to form a unitary multilaminar panel comprising the lightweight core, the compression-resistant sheet and the facing sheet.

7. The method of claim 6 wherein a pair of sub-assemblies is assembled one on each side of the lightweight core and the unitary multilaminar article produced comprises the core bonded on each side to a compression-resistant sheet with the opposite side of each compression-resistant sheet bonded to a facing sheet.

8. A structural panel including a facing sheet of a thermoset polyester resinous composition reinforced with glass filaments, a rigid compression resistant sheet and a layer of adhesive in direct contact with one surface of said facing sheet and one surface of said compression-resistant sheet and bonding said facing sheet to said compression resistant sheet, a core of a rigid, foamed, lightweight resinous material and a layer of adhesive in direct contact with said core and said compression resistant sheet and bonding said compression resistant sheet to said core, said core being relatively thicker than either of said compression resistant sheet and said facing sheet, and said compression-resistant sheet being a material other than the material forming said facing sheet.

9. A panel consisting of a lightweight foamed resinous core, at least one sheet of a rigid compression resistant material and a layer of adhesive bonding said core and one surface of said compression resistant material and the other surface of said sheet having thereon a layer of adhesive bonding thereto a relatively thin facing sheet of a thermoset polyester resinous composition reinforced with about 35% to about 60% by weight of glass filaments, and said compression-resistant sheet being a material other than the material forming said facing sheet.

10. A structural panel having a core of a foamed polystyrene type resin having a density between about 2 and about 10 pounds per cubic foot, one side surface of said core having thereon a thin layer of an adhesive and in direct contact therewith a facing sheet of substantially uniform thickness comprising a sheet of a thermoset polyester resin reinforced with glass filaments, the other side surface of said core having thereon a thin layer of an adhesive, a rigid compression resistant sheet in direct contact with said adhesive, a layer of adhesive on the other surface of said compression resistant sheet and a facing sheet comprising a thermoset polyester resinous composition reinforced with glass filaments in contact with the adhesive layer on said other surface of said compression resistant sheet, and said compression-resistant sheet being a material other than the material forming said facing sheet.

11. A structural panel having a core of a foamed polystyrene-type resin having a density between about 2 and about 10 pounds/cubic foot, a thin layer of adhesive covering opposite side surfaces of said core, compression resistant sheets in direct contact with said thin layers of adhesive on the other surfaces of said compression resistant sheets and facing sheets of substantially uniform thickness in direct contact with said adhesive layer on said compression resistant sheet, each said facing sheet comprising a thermoset polyester resin reinforced with glass filaments, and said compression resistant sheets being a material other than the material forming said facing sheets.

References Cited in the file of this patent

UNITED STATES PATENTS

| | | |
|---|---|---|
| 2,414,125 | Rheinfrank | Jan. 14, 1947 |
| 2,576,073 | Kropa et al. | Nov. 20, 1951 |
| 2,606,598 | Smith | Aug. 12, 1952 |
| 2,648,543 | Grabowski | Aug. 11, 1953 |
| 2,656,296 | Grangaard | Oct. 20, 1953 |
| 2,693,922 | Ellison et al. | Nov. 9, 1954 |
| 2,728,702 | Simon et al. | Dec. 27, 1955 |

FOREIGN PATENTS

| | | |
|---|---|---|
| 1,075,345 | France | Oct. 14, 1954 |
| 1,082,060 | France | Dec. 27, 1954 |